(12) United States Patent  (10) Patent No.: US 9,156,109 B2
Nomaru et al.  (45) Date of Patent: Oct. 13, 2015

(54) LASER PROCESSING APPARATUS

(71) Applicant: Disco Corporation, Tokyo (JP)

(72) Inventors: Keiji Nomaru, Tokyo (JP); Goro Watanabe, Tokyo (JP); Hiroshi Morikazu, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 121 days.

(21) Appl. No.: 13/783,947

(22) Filed: Mar. 4, 2013

(65) Prior Publication Data

US 2013/0240494 A1 Sep. 19, 2013

(30) Foreign Application Priority Data

Mar. 16, 2012 (JP) .................. 2012-060018

(51) Int. Cl.
| | |
|---|---|
| B23K 26/00 | (2014.01) |
| B23K 26/14 | (2014.01) |
| B23K 26/16 | (2006.01) |
| B23K 26/06 | (2014.01) |
| B23K 26/02 | (2014.01) |
| B23K 26/08 | (2014.01) |
| B23K 26/38 | (2014.01) |
| B23K 26/40 | (2014.01) |

(52) U.S. Cl.
CPC ............ B23K 26/38 (2013.01); B23K 26/0652 (2013.01); B23K 26/0807 (2013.01); B23K 26/0853 (2013.01); B23K 26/0869 (2013.01); B23K 26/4075 (2013.01)

(58) Field of Classification Search
CPC ............. B23K 26/38; B23K 26/0652; B23K 26/0807; B23K 26/0853; B23K 26/0869; B23K 26/4075

USPC ............ 219/121.6, 121.61, 121.67, 121.68, 219/121.73–121.76, 121.62–121.64, 219/121.78–121.85

See application file for complete search history.

(56) References Cited

U.S. PATENT DOCUMENTS

| | | | | |
|---|---|---|---|---|
| 4,675,500 | A | * | 6/1987 | Kunz et al. ............... 219/121.73 |
| 2003/0059950 | A1 | * | 3/2003 | Simeonsson .................. 436/182 |
| 2006/0126675 | A1 | * | 6/2006 | Eno et al. ........................ 372/21 |
| 2010/0044358 | A1 | * | 2/2010 | Furuta et al. ............. 219/121.72 |
| 2012/0276754 | A1 | * | 11/2012 | Cordingley et al. .......... 438/795 |

FOREIGN PATENT DOCUMENTS

JP  2006-108478  4/2006

* cited by examiner

*Primary Examiner* — Dana Ross
*Assistant Examiner* — Lindsey C Teaters
(74) *Attorney, Agent, or Firm* — Greer Burns & Crain, Ltd.

(57) ABSTRACT

A laser processing apparatus including a workpiece holding unit for holding a workpiece and a laser beam applying unit for applying a laser beam to the workpiece held by the workpiece holding unit. The laser beam applying unit includes a laser oscillator for oscillating a laser beam, a focusing unit for focusing the laser beam oscillated by the laser oscillator onto the workpiece held by the workpiece holding unit, and an optical system provided between the laser oscillator and the focusing unit for transmitting the laser beam oscillated by the laser oscillator. The laser beam applying unit further includes a wavelength converting mechanism provided between the optical system and the focusing unit for converting the wavelength of the laser beam oscillated by the laser oscillator into a short wavelength.

20 Claims, 4 Drawing Sheets

LASER PROCESSING APPARATUS

BACKGROUND OF THE INVENTION

1. Field of the Invention

The present invention relates to a laser processing apparatus for performing laser processing to a workpiece such as a semiconductor wafer.

2. Description of the Related Art

In a semiconductor device fabrication process, a plurality of crossing division lines called streets are formed on the front side of a substantially disk-shaped semiconductor wafer to thereby partition a plurality of regions where a plurality of devices such as ICs and LSIs are respectively formed. The semiconductor wafer is cut along the streets to thereby divide the regions where the devices are formed from each other, thus obtaining a plurality of individual semiconductor chips. Further, an optical device wafer is provided by forming a plurality of optical devices including photodetectors such as photodiodes and light emitting devices such as laser diodes on the front side of a sapphire substrate. The optical device wafer is also cut along the streets to obtain the individual optical devices divided from each other, such as photodiodes and laser diodes, which are widely used in electric equipment.

As a method of dividing a wafer such as a semiconductor wafer and an optical device wafer along the streets, there has been proposed a method of applying a pulsed laser beam having an absorption wavelength to the wafer along the streets to thereby form laser processed grooves by ablation, thus dividing the wafer along the streets.

As another method of dividing such a wafer as mentioned above, there is a method including the steps of applying a pulsed laser beam having a transmission wavelength to the wafer in the condition where the focal point of the pulsed laser beam is set inside the wafer in an area to be divided, thereby continuously forming modified layers inside the wafer along the streets and next applying an external force along the streets where the modified layers are respectively formed to be reduced in strength, thereby dividing the wafer along the streets.

Such laser processing is performed by using a laser processing apparatus including workpiece holding means for holding a workpiece and laser beam applying means for applying a laser beam to the workpiece held by the workpiece holding means. The laser beam applying means is composed of laser beam oscillating means for oscillating a laser beam, focusing means for focusing the laser beam oscillated by the laser beam oscillating means onto the workpiece held by the workpiece holding means, and an optical system provided between the laser beam oscillating means and the focusing means and including power adjusting means for adjusting the power of the laser beam and a beam expander for adjusting the diameter of the laser beam (see Japanese Patent Laid-open No. 2006-108478, for example).

SUMMARY OF THE INVENTION

In the case that the wavelength of the laser beam oscillated by the laser beam oscillating means is a short wavelength reaching an ultraviolet region, e.g., 355 nm or 266 nm, the optical system is damaged in a relatively short time. Accordingly, in the case that the wavelength of the laser beam oscillated by the laser beam oscillating means is a short wavelength, there is a problem such that the optical system must be replaced at a high frequency, causing poor economy.

It is therefore an object of the present invention to provide a laser processing apparatus which can suppress damage to the optical system.

In accordance with an aspect of the present invention, there is provided a laser processing apparatus including workpiece holding means for holding a workpiece; laser beam applying means for applying a laser beam to the workpiece held by the workpiece holding means, the laser beam applying means including laser beam oscillating means for oscillating a laser beam, focusing means for focusing the laser beam oscillated by the laser beam oscillating means onto the workpiece held by the workpiece holding means, and an optical system provided between the laser beam oscillating means and the focusing means for transmitting the laser beam oscillated by the laser beam oscillating means; and a wavelength converting mechanism provided between the optical system and the focusing means for converting the wavelength of the laser beam oscillated by the laser beam oscillating means into a short wavelength.

Preferably, the wavelength converting mechanism includes wavelength converting means having a wavelength conversion crystal, and a Pellin-Broca prism for dividing an input laser beam into a laser beam converted in wavelength by the wavelength converting means and a laser beam not converted in wavelength; the laser beam converted in wavelength by the wavelength converting means being led from the Pellin-Broca prism to the focusing means.

Preferably, the wavelength converting mechanism further includes a beam damper for absorbing the laser beam not converted in wavelength. Preferably, the wavelength converting means includes a plurality of wavelength conversion crystals adapted to be selected or combined.

In the present invention, the wavelength converting mechanism for converting the wavelength of the laser beam oscillated by the laser beam oscillating means into a short wavelength is provided between the optical system and the focusing means. Accordingly, the laser beam passing through the optical system has a long wavelength, so that damage to the optical system can be suppressed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENT

Figure 1:
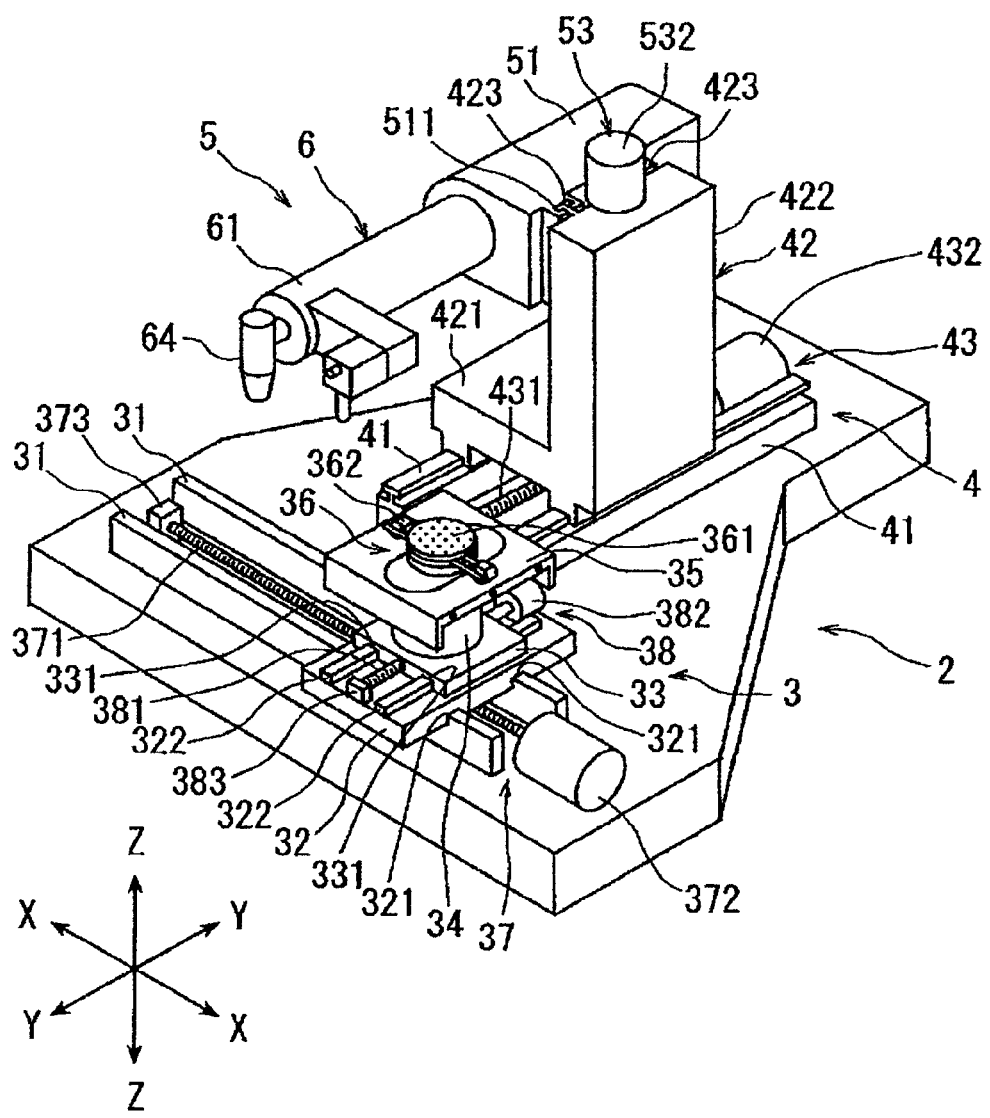
FIG. 1 is a perspective view of a laser processing apparatus according to a preferred embodiment of the present invention.

A preferred embodiment of the laser processing apparatus according to the present invention will now be described in detail with reference to the attached drawings. FIG. 1 is a perspective view of a laser processing apparatus according to a preferred embodiment of the present invention. The laser processing apparatus shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface (holding surface) of the vacuum chuck 361 by operating suction means (not shown). The chuck table 36 is rotatable by a pulse motor (not shown) provided in the cylindrical member 34. Further, the chuck table 36 is provided with clamps 362 for fixing an annular frame (not shown).

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end thereof to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 for moving the second slide block 33 in the Y direction along the guide rails 322. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end thereof to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and laser beam applying means 6 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction by the slidable engagement of the guided grooves 511 with the guide rails 423.

The laser beam applying unit 5 further includes focal position adjusting means 53 for moving the unit holder 51 along the guide rails 423 in the Z direction. The focal position adjusting means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the laser beam applying means 6 are moved in the Z direction along the guide rails 423 by operating the pulse motor 532 to normally or reversely rotate this externally threaded rod. In this preferred embodiment, when the pulse motor 532 is normally operated, the laser beam applying means 6 is moved upward, whereas when the pulse motor 532 is reversely operated, the laser beam applying means 6 is moved downward.

Figure 2:
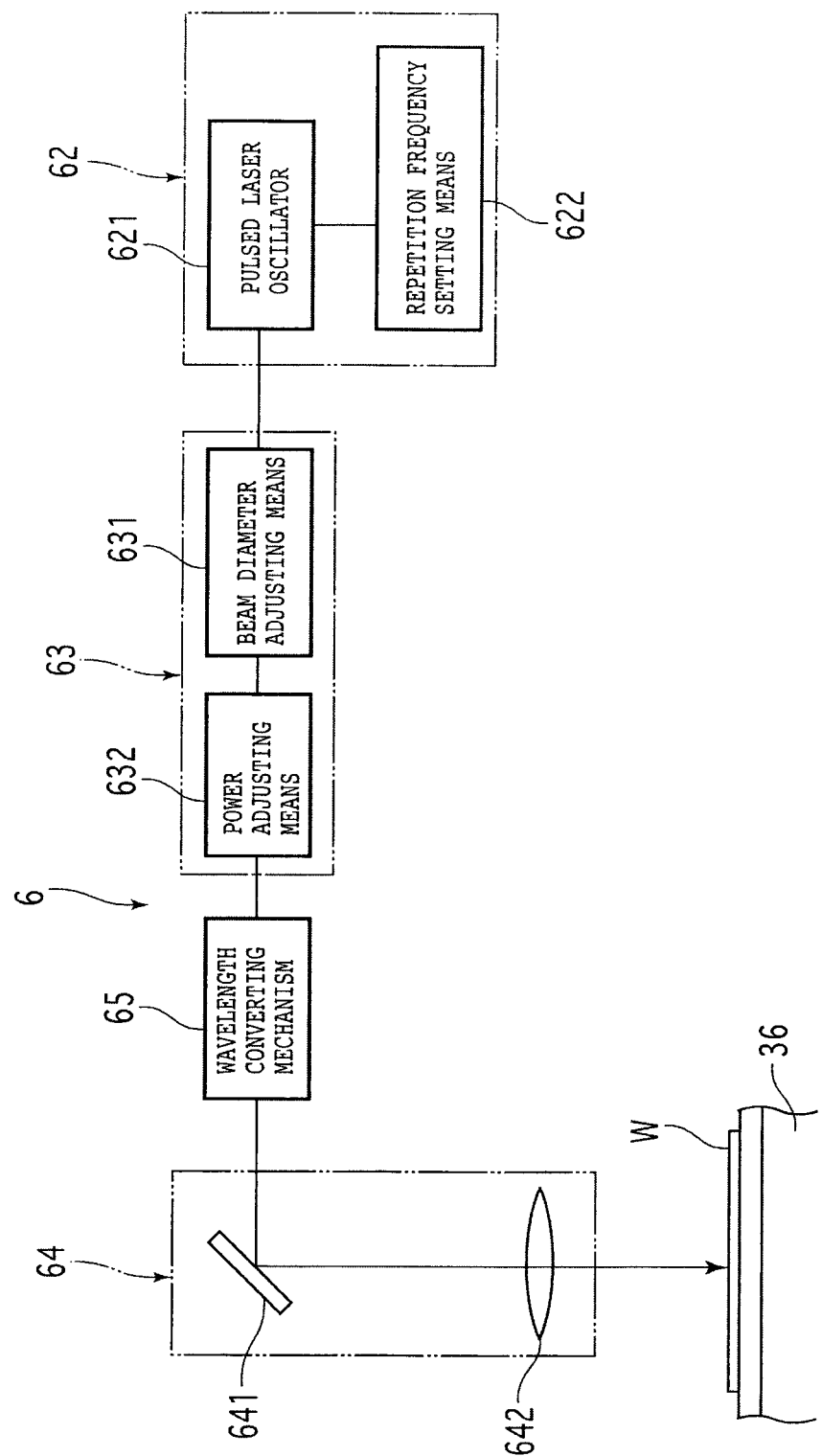
FIG. 2 is a block diagram showing the configuration of laser beam applying means included in the laser processing apparatus shown in FIG. 1.

The laser beam applying means 6 includes a cylindrical casing 61 fixed to the unit holder 51 so as to extend in a substantially horizontal direction. The configuration of the laser beam applying means 6 will now be described with reference to FIG. 2. The laser beam applying means 6 includes pulsed laser beam oscillating means 62 provided in the casing 61, an optical system 63 for transmitting a pulsed laser beam oscillated by the pulsed laser beam oscillating means 62, focusing means 64 for focusing the pulsed laser beam transmitted by the optical system 63 and applying this pulsed laser beam to a workpiece W held on the holding surface of the chuck table 36, and a wavelength converting mechanism 65 provided between the optical system 63 and the focusing means 64 for converting the wavelength of the pulsed laser beam oscillated by the pulsed laser beam oscillating means 62 into a short wavelength suitable for processing of the workpiece W.

The pulsed laser beam oscillating means 62 is composed of a pulsed laser oscillator 621 for oscillating a pulsed laser beam having a wavelength of 1064 nm, for example and repetition frequency setting means 622 for setting the repetition frequency of the pulsed laser beam to be oscillated by the pulsed laser oscillator 621. The optical system 63 is composed of beam diameter adjusting means 631 for adjusting the beam diameter of the pulsed laser beam oscillated by the pulsed laser beam oscillating means 62 and power adjusting means 632 for adjusting the power of the pulsed laser beam oscillated by the pulsed laser beam oscillating means 62 to a predetermined power. The pulsed laser oscillator 621 and the repetition frequency setting means 622 of the pulsed laser beam oscillating means 62 and the beam diameter adjusting means 631 and the power adjusting means 632 of the optical system 63 are controlled by control means (not shown).

The focusing means 64 includes a direction changing mirror 641 for changing the traveling direction of the pulsed laser beam oscillated by the pulsed laser beam oscillating means 62, next transmitted by the optical system 63, and next converted in wavelength by the wavelength converting mechanism 65 toward the holding surface of the chuck table 36 and a focusing lens 642 for focusing the pulsed laser beam changed in traveling direction by the direction changing mirror 641 and applying this pulsed laser beam to the workpiece W held on the chuck table 36. As shown in FIG. 1, the focusing means 64 is mounted at the front end of the casing 61.

Figure 3:
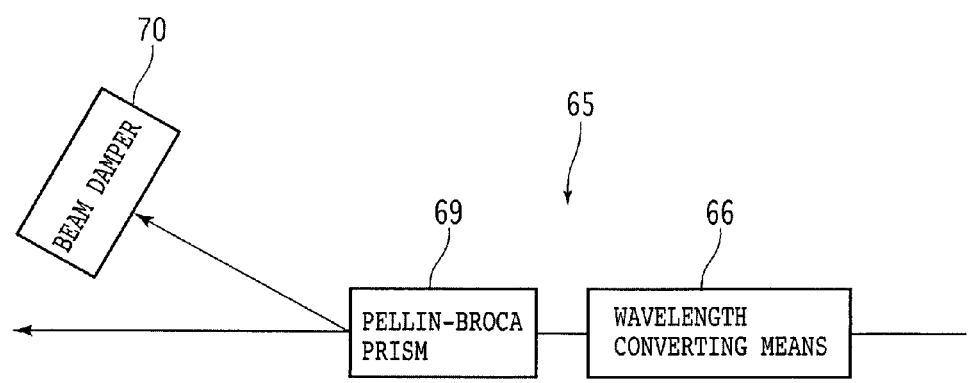
FIG. 3 is a block diagram showing the configuration of a wavelength converting mechanism constituting the laser beam applying means shown in FIG. 2.

The configuration of the wavelength converting mechanism 65 provided between the optical system 63 and the focusing means 64 will now be described with reference to FIG. 3. The wavelength converting mechanism 65 includes wavelength converting means 66 having a wavelength conversion crystal such as LBO crystal, CLBO crystal, and BBO crystal, a Pellin-Broca prism 69, and a beam damper 70.

Figure 4:
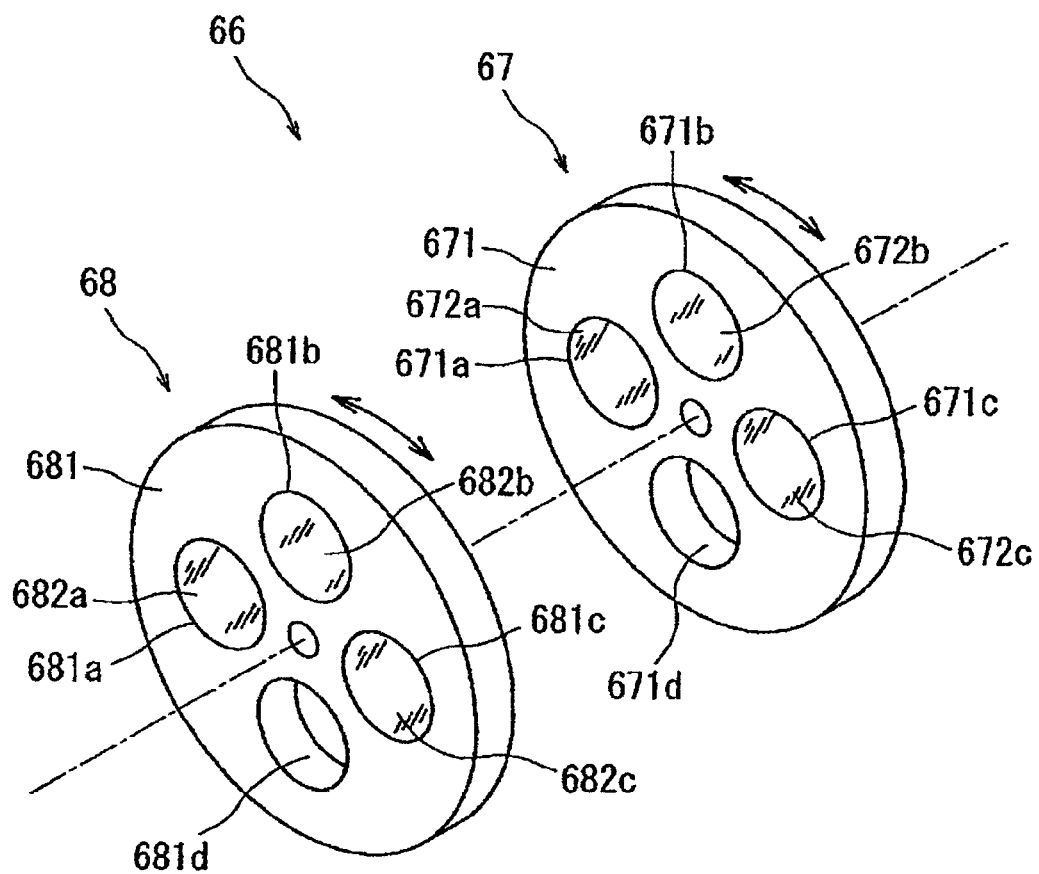
FIG. 4 is a perspective view of wavelength converting means constituting the wavelength converting mechanism shown in FIG. 3.

As shown in FIG. 4, the wavelength converting means 66 is composed of first wavelength converting means 67 and second wavelength converting means 68. The first wavelength converting means 67 includes a rotating disk 671. The rotating disk 671 has four through holes 671a, 671b, 671c, and 671d. Of all the four through holes 671a, 671b, 671c, and 671d of the rotating disk 671, the three through holes 671a, 671b, and 671c are respectively filled with three wavelength conversion crystals 672a, 672b, and 672c each formed from LBO crystal ($LiB_3O_5$ crystal). The remaining through hole 671d is not filled with a wavelength conversion crystal. The second wavelength converting means 68 also includes a rotating disk 681 similar to the rotating disk 671 of the first wavelength converting means 67. The rotating disk 681 has four through holes 681a, 681b, 681c, and 681d. Of all the four through holes 681a, 681b, 681c, and 681d of the rotating disk 681, the three through holes 681a, 681b, and 681c are respectively filled with three wavelength conversion crystals 682a, 682b, and 682c each formed from CLBO crystal ($CsLiB_6O_{10}$ crystal). The remaining through hole 681d is not filled with a wavelength conversion crystal.

The first wavelength converting means 67 and the second wavelength converting means 68 are axially opposed to each other, and each of the first and second wavelength converting means 67 and 68 is rotatable about its rotation axis by a rotating mechanism (not shown). The wavelength conversion crystals 672a, 672b, and 672c formed from LBO crystals and the wavelength conversion crystals 682a, 682b, and 682c formed from CLBO crystals have a function of converting the wavelength of an input laser beam into a half wavelength. Accordingly, the pulsed laser beam having a wavelength of 1064 nm oscillated by the pulsed laser beam oscillating means 62 is converted into a pulsed laser beam having a wavelength of 532 nm by passing through either any one of the wavelength conversion crystals 672a, 672b, and 672c formed from LBO crystals or any one of the wavelength conversion crystals 682a, 682b, and 682c formed from CLBO crystals. Further, the pulsed laser beam having a wavelength of 1064 nm oscillated by the pulsed laser beam oscillating means 62 is also converted into a pulsed laser beam having a wavelength of 266 nm by passing through both any one of the wavelength conversion crystals 672a, 672b, and 672c formed from LBO crystals and any one of the wavelength conversion crystals 682a, 682b, and 682c formed from CLBO crystals.

In this manner, the wavelength converting means 66 operates to convert the pulsed laser beam having a wavelength of 1064 nm passed through the optical system 63 into the pulsed laser beam having a wavelength of 532 nm or 266 nm. That is, the pulsed laser beam passing through the optical system 63 has a long wavelength, so that damage to the optical system 63 can be suppressed. Further, in the wavelength converting means 66, any one of the wavelength conversion crystals 672a, 672b, and 672c of LBO crystals provided in the first wavelength converting means 67 may be suitably selected. Similarly, any one of the wavelength conversion crystals 682a, 682b, and 682c of CLBO crystals provided in the second wavelength converting means 68 may be suitably selected. Further, any one of the wavelength conversion crystals 672a to 672c and any one of the wavelength conversion crystals 682a to 682c may be combined. Accordingly, the wavelength of the pulsed laser beam can be converted into a wavelength suitable for processing of the workpiece W. Further, even when the wavelength conversion crystal in use is damaged, any other unused one of the wavelength conversion crystals may be suitably selected for use to allow the continuation of laser processing, thereby improving the productivity.

Referring back to FIG. 3, the pulsed laser beam passed through the wavelength converting means 66 including the wavelength conversion crystals mentioned above reaches the Pellin-Broca prism 69. The Pellin-Broca prism 69 functions to divide the input pulsed laser beam into a pulsed laser beam converted in wavelength by the wavelength converting means 66 and a pulsed laser beam not converted in wavelength. The pulsed laser beam converted in wavelength by the wavelength converting means 66 is led from the Pellin-Broca prism 69 to the focusing means 64, whereas the pulsed laser beam not converted in wavelength is led from the Pellin-Broca prism 69 to the beam damper 70, in which the pulsed laser beam not converted in wavelength is absorbed by the beam damper 70.

In this manner, the pulsed laser beam having a wavelength of 1064 nm oscillated by the pulsed laser beam oscillating means 62 is converted into the pulsed laser beam having a wavelength of 532 nm or 266 nm by the wavelength converting means 66 and then applied through the focusing means 64 to the workpiece W held on the chuck table 36, thereby performing various laser processing operations including ablation processing for forming a laser processed groove along a street formed on a wafer, via hole processing for forming a laser processed hole extending from the back side of a wafer to an electrode provided on the front side of the wafer, and lift-off processing for applying a laser beam from the back side of an epitaxy substrate to a buffer layer to thereby peel the epitaxy substrate and transfer an optical device layer to a transfer substrate.

As described above, the pulsed laser beam having a wavelength of 1064 nm is oscillated by the pulsed laser beam oscillating means 62 and the wavelength of this pulsed laser beam is converted into 532 nm or 266 nm by the wavelength converting means 66 composed of the first wavelength converting means 67 and the second wavelength converting means 68. However, in the case of using pulsed laser beam oscillating means for oscillating a pulsed laser beam having a wavelength of 532 nm, either the first wavelength converting means 67 or the second wavelength converting means 68 may be used. Further, it is desirable to locate the wavelength converting means 66 at a minimum distance from the focusing means 64, thereby maximizing the optical path length of the laser beam having a long wavelength oscillated by the pulsed laser beam oscillating means.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
   workpiece holding means for holding a workpiece;
   laser beam applying means for applying a processing laser beam to said workpiece held by said workpiece holding means, said laser beam applying means including laser beam oscillating means for oscillating a processing laser beam, focusing means for focusing said processing laser beam oscillated by said laser beam oscillating means onto said workpiece held by said workpiece holding means, and an optical system provided between said laser beam oscillating means and said focusing means for transmitting said processing laser beam oscillated by said laser beam oscillating means; and
   a wavelength converting mechanism provided between said optical system and said focusing means for converting the wavelength of said processing laser beam oscillated by said laser beam oscillating means into a short wavelength.

2. The laser processing apparatus according to claim 1, wherein said wavelength converting mechanism includes wavelength converting means having a wavelength conversion crystal, and a Pellin-Broca prism for dividing an input laser beam into a laser beam converted in wavelength by said wavelength converting means and a laser beam not converted in wavelength;
   said laser beam converted in wavelength by said wavelength converting means being led from said Pellin-Broca prism to said focusing means.

3. The laser processing apparatus according to claim 2, wherein said wavelength converting mechanism further includes a beam damper for absorbing said laser beam not converted in wavelength.

4. The laser processing apparatus according to claim 2, wherein said wavelength converting means includes a plurality of wavelength conversion crystals adapted to be selected or combined.

5. The laser processing apparatus according to claim 2, wherein said processing laser beam passes directly from said wavelength conversion crystal to said Pellin-Broca prism.

6. The laser processing apparatus according to claim 1, wherein the processing laser beam is configured for a laser processing operation selected from the group consisting of: (i) ablation processing for forming a laser processed groove in the workpiece; (ii) via hole processing for forming a laser processed hole in the workpiece; and (iii) lift-off processing for applying a laser beam to a buffer layer of the workpiece to thereby peel a substrate layer from a device layer.

7. The laser processing apparatus according to claim 1, wherein the wavelength converting mechanism comprises a wavelength converting means that includes a rotatable disk including a plurality of through holes therein, wherein at least some of said through holes include a wavelength conversion crystal therein for converting the wavelength of said processing laser beam into a different wavelength.

8. The laser processing apparatus according to claim 7, wherein at least one of said through holes is not filled with a wavelength conversion crystal.

9. The laser processing apparatus according to claim 1, wherein the wavelength converting mechanism comprises a wavelength converting means that includes a rotatable disk including four through holes therein, wherein three of said through holes each include a wavelength conversion crystal therein for converting the wavelength of said processing laser beam into a different wavelength, and a fourth one of said four through holes lacks a wavelength conversion crystal therein.

10. The laser processing apparatus according to claim 1, wherein the wavelength converting mechanism comprises:
    a first wavelength converting means that includes a first rotatable disk including a plurality of first through holes therein, wherein at least some of said first through holes include a wavelength conversion crystal therein for converting the wavelength of said processing laser beam into a different wavelength; and
    a second wavelength converting means that includes a second rotatable disk including a plurality of second through holes therein, wherein at least some of said second through holes include a wavelength conversion crystal therein for converting the wavelength of said processing laser beam into a different wavelength.

11. The laser processing apparatus according to claim 10, wherein said first rotatable disk and said second rotatable disk are configured and arranged to rotate about the same axis.

12. The laser processing apparatus according to claim 10, wherein at least one of said first through holes and at least one of said second through holes are not filled with a wavelength conversion crystal.

13. The laser processing apparatus according to claim 10, wherein at least one of said first and second through holes is not filled with a wavelength conversion crystal.

14. The laser processing apparatus according to claim 13, wherein at least three of said first through holes are filled with a wavelength conversion crystal and at least three of said second through holes are filled with a wavelength conversion crystal.

15. The laser processing apparatus according to claim 1, wherein the short wavelength resulting from said wavelength converting mechanism is one half of the original wavelength of the laser processing beam.

16. The laser processing apparatus according to claim 1, wherein the short wavelength resulting from said wavelength converting mechanism is one quarter of the original wavelength of the laser processing beam.

17. The laser processing apparatus according to claim 1, wherein the processing laser beam oscillated by the laser processing oscillating means originally has a wavelength of 1064 nm, and said short wavelength resulting from said wavelength converting mechanism is either 532 nm or 266 nm.

18. The laser processing apparatus according to claim 1, wherein said optical system comprises:
    a beam diameter adjusting means for adjusting the beam diameter of the processing laser beam; and
    a power adjusting means for adjusting the power of the processing laser beam.

19. The laser processing apparatus according to claim 1, wherein said optical system comprises a beam diameter adjusting means for adjusting the beam diameter of the processing laser beam.

20. A laser processing apparatus comprising:
    a chuck table that is configured and arranged to hold a workpiece;
    a laser beam applying unit that is configured and arranged to apply a processing laser beam to the workpiece held by said chuck table, said laser beam applying unit including a laser beam oscillator that oscillates a processing laser beam, a focusing lens that focuses the processing laser beam oscillated by said laser beam oscillator onto the workpiece held by said chuck table, and an optical system provided between said laser beam oscillator and said focusing lens, wherein said optical system is configured and arranged to transmit the processing laser beam oscillated by said laser beam oscillator; and
    a wavelength converting mechanism provided between said optical system and said focusing lens, wherein said wavelength converting mechanism is configured and arranged to convert the wavelength of the processing laser beam oscillated by said laser beam oscillator into a short wavelength,
    wherein the wavelength converting mechanism comprises:
    a first rotatable disk including a plurality of first through holes therein, wherein at least some of said first through holes include a wavelength conversion crystal therein for converting the wavelength of the processing laser beam into a different wavelength; and
    a second rotatable disk including a plurality of second through holes therein, wherein at least some of said second through holes include a wavelength conversion crystal therein for converting the wavelength of the processing laser beam into a different wavelength, and
    wherein said first rotatable disk and said second rotatable disk are configured and arranged to rotate about the same axis.

* * * * *